(12) United States Patent
Fries, IV et al.

(10) Patent No.: US 8,488,624 B2
(45) Date of Patent: Jul. 16, 2013

(54) METHOD AND APPARATUS FOR PROVIDING AN AREA NETWORK MIDDLEWARE INTERFACE

(75) Inventors: Robert Gustav Fries, IV, Cincinnati, OH (US); John Wei-Iy Lin, Moraga, CA (US)

(73) Assignee: Wireless Glue Networks, Inc., Walnut Creek, CA (US)

( * ) Notice: Subject to any disclaimer, the term of this patent is extended or adjusted under 35 U.S.C. 154(b) by 234 days.

(21) Appl. No.: 12/924,168

(22) Filed: Sep. 22, 2010

(65) Prior Publication Data

US 2011/0069719 A1 Mar. 24, 2011

Related U.S. Application Data

(60) Provisional application No. 61/277,288, filed on Sep. 23, 2009.

(51) Int. Cl.
*H04J 3/22* (2006.01)

(52) U.S. Cl.
USPC ............ 370/466; 370/401; 370/463; 370/469

(58) Field of Classification Search
USPC ............ 370/389, 400, 463, 466, 412; 386/46; 700/94; 707/513; 709/224; 717/146
See application file for complete search history.

(56) References Cited

U.S. PATENT DOCUMENTS

| | | | |
|---|---|---|---|
| 5,892,950 A * | 4/1999 | Rigori et al. | 717/146 |
| 6,643,652 B2 | 11/2003 | Helgeson et al. | |
| 2002/0143815 A1 * | 10/2002 | Sather | 707/513 |
| 2002/0164149 A1 * | 11/2002 | Wilkinson | 386/46 |
| 2004/0208480 A1 | 10/2004 | Yoon et al. | |
| 2005/0273522 A1 | 12/2005 | Kohler | |
| 2006/0241796 A1 * | 10/2006 | Messer et al. | 700/94 |
| 2006/0242325 A1 | 10/2006 | Ramaswamy et al. | |
| 2008/0049774 A1 * | 2/2008 | Swenson et al. | 370/412 |
| 2009/0248854 A1 * | 10/2009 | Conway | 709/224 |

OTHER PUBLICATIONS

International Search Report and Written Opinion dated Jun. 29, 2011 for PCT Application No. PCT/US2010/050027.

* cited by examiner

*Primary Examiner* — Hassan Kizou
*Assistant Examiner* — Toan Nguyen
(74) *Attorney, Agent, or Firm* — Moser Taboada

(57) ABSTRACT

A method and apparatus for implementing a protocol-neutral middleware interface in a home area network. The method comprises receiving one or more data packets from a client device using a first communication protocol, and decoding the data packets into a set of platform independent data objects. The data packets are decoded into the platform independent data objects by utilizing a metadata mapping located within one or more field classes. The apparatus comprises a frame engine, and one or more field classes. The frame engine receives a data packet in a first communication protocol. The frame engine decodes the data packet into a set of platform independent data objects. The frame engine uses a metadata map contained within the one or more field classes to decode the data packet into the set of platform independent data objects.

14 Claims, 4 Drawing Sheets

METHOD AND APPARATUS FOR PROVIDING AN AREA NETWORK MIDDLEWARE INTERFACE

CROSS-REFERENCE TO RELATED APPLICATIONS

This application claims benefit of U.S. provisional patent application Ser. No. 61/277,288 filed Sep. 23, 2009 which is herein incorporated by reference.

BACKGROUND OF THE INVENTION

1. Field of the Invention

Embodiments of the present invention generally relate to computer networking and, more particularly, to a method and apparatus for a home area network middleware interface.

2. Description of the Related Art

With the advent of affordable wireless technology, home network environments have become inexpensive and ubiquitous. Manufacturers have recognized the potential benefits of this connectivity and many common household devices are retrofitted with wireless transmitters and receivers for the purpose of home automation. Some of these benefits include appliances that monitor and report their energy consumption to a central server to provide "smart" energy, lights, appliances, and thermostats that respond to changing environmental conditions or set programmed profiles, fingerprint locking mechanisms for home security systems, and the like.

One common method for wireless network communication over computer networks is TCP/IP using the 802.11 series of standards. However, this communications protocol is often unsuitable for the purposes of home automation and integration due to the cost of equipment and the programming overhead in implementing a functional TCP/IP stack on a comparatively low powered device. As such, manufacturers have recognized the potential benefits of other protocols such as IrDA, Bluetooth, UWB, and ZigBee, such as lower power consumption, easier configuration, mesh network capabilities, and the like.

Configuring these devices to interface with a home network can be problematic. The driver programs responsible for automating and integrating the household devices commonly execute on personal computers or other devices having substantial computing power that facilitates communication over TCP/IP. Such computing platforms allow the driver program to send and receive data from the Internet, providing benefits such as access for remote users or the ability to upload data to a central server. The execution of the TCP/IP stack is commonly provided by the operating system or network device driver. In order for the driver program to communicate with the remote devices, the driver must execute an additional protocol stack to transmit in the proper protocol. This may result in significant programming overhead and a need for substantial computing capability. It would be advantageous for the driver program to communicate with the household devices in a platform independent manner while requiring little extra computing capability.

Therefore, there is a need in the art for a method and apparatus for providing a platform independent interface to remote household devices.

SUMMARY OF THE INVENTION

An embodiment of the present invention comprises a method and apparatus for implementing a protocol-neutral middleware interface in a home area network. The method comprises receiving one or more data packets from a client device using a first communication protocol, and decoding the data packets into a set of platform independent data objects. The data packets are decoded into the platform independent data objects by utilizing a metadata mapping located within one or more field classes.

The apparatus comprises a frame engine, and one or more field classes. The frame engine receives a data packet in a first communication protocol. The frame engine decodes the data packet into a set of platform independent data objects. The frame engine uses a metadata map contained within the one or more field classes to decode the data packet into the set of platform independent data objects.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
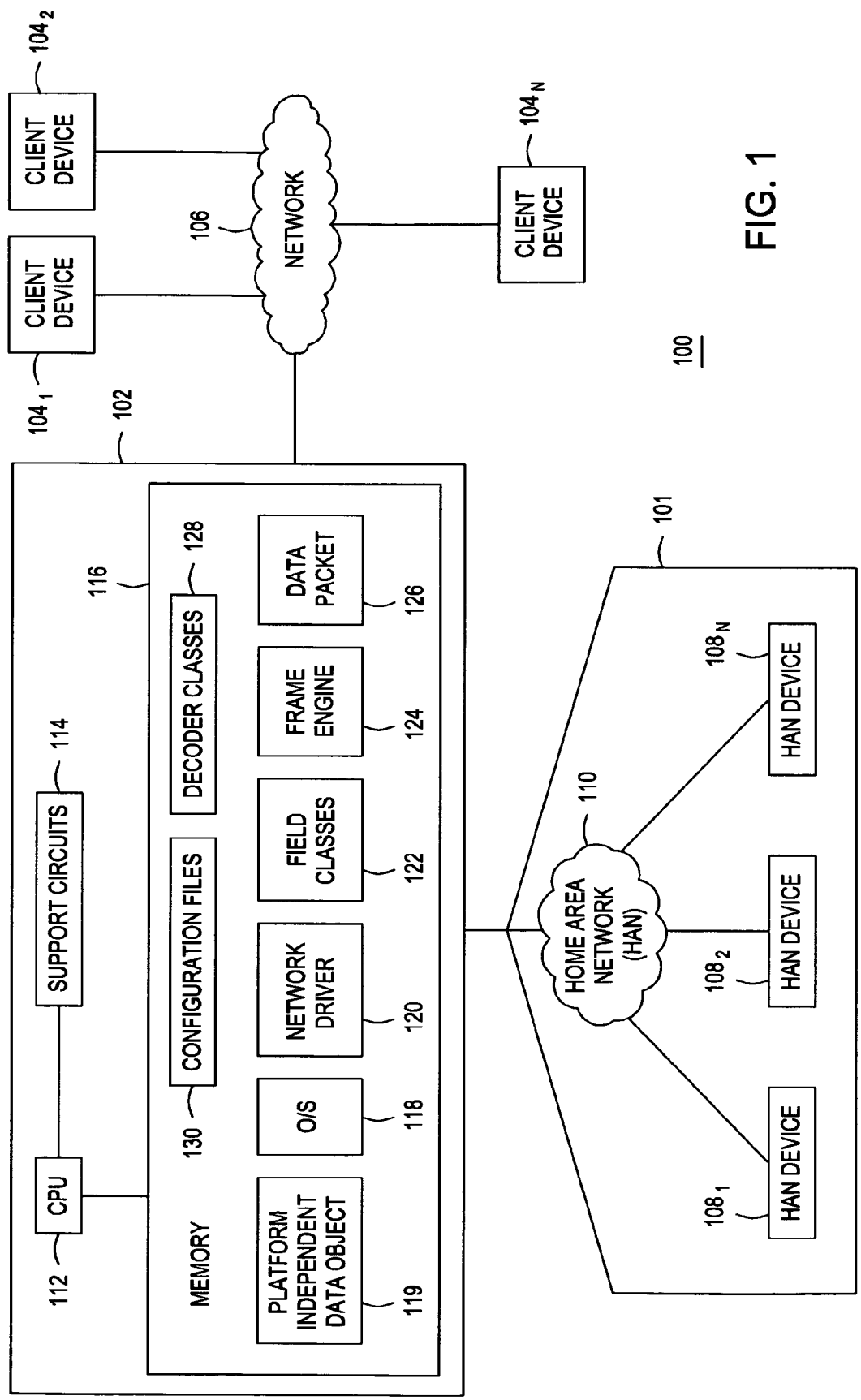
FIG. 1 is a block diagram depicting a computer network in which an embodiment of the present invention is used.

FIG. 1 is a block diagram depicting an embodiment of a system 100 utilizing an embodiment of the present invention. In one embodiment, the system 100 is comprised of a routing computer 102 coupled to a network 106 and a home area network ("HAN") 110. HANs are commonly used to monitor and control common household appliances and devices. For example, thermostat devices may work in concert with a home heating system to enable temperature monitoring and control via a software program, light sensors may trigger household lights to turn off or on, monitoring programs may use embedded energy meters to report power consumption to a central server, and the like.

In some embodiments, the HAN 110 is located within a home 101. In some embodiments, the routing computer 102 and the network 106 may also be located within the home 101. In other embodiments, the routing computer 102 and the home network 106 may remotely monitor the devices of the HAN 110 from outside the home.

One or more client devices 104 are coupled to one another and the routing computer 102 via the home network 106. In one embodiment, the client devices 104 are general purpose computing devices as commonly known in the art. The client devices 104 may run software applications designed to allow control, monitoring, and access of devices coupled to a HAN 110.

The home network 106 may be coupled to the routing computer 102 by wires or wirelessly in the manner well-known in the art. In some embodiments, the home network 106 or routing device 102 may also be coupled to the Internet. One or more HAN devices 108 are coupled to one another and the routing computer 102 via the HAN 110. The HAN devices 108 may be common household devices equipped for transmitting and receiving information via the HAN 110, such as light and temperature sensors, light switches, stereo systems, washers, dryers, refrigerators, or any other common household device that would benefit from connecting to a HAN. The client devices 104 communicate data packets 126 to the routing computer 102 for transmission to the HAN devices 108.

The routing computer 102 parses the data packets 126 and translates them into one or more platform independent data objects 119. Note that while the present embodiment of the invention is discussed with respect to decoding data packets 126 into platform independent data objects 119, one of ordinary skill in the art would recognize that the method is equally applicable to the decoding of a data packet of one format into a data packet of another format. The platform independent data objects 119 are stored in a platform independent format as data objects suitable for access and modification. The platform independent data representation may consist of complex data objects, though the API gives access to the constituent fields as JAVA primitives, as appropriate for the field type. Each field type (defined at run time in a configuration file) indicates which primitives are supported by the presence of appropriate interfaces in the definition (a class can implement any number of interfaces). These interface declarations are in the class itself; the configuration file maps the field name to the class definition. For instance, if a field class implements the "ILongValue" interface, then it supports getting and setting the field value as a "long" integer type. Similar interfaces exist for the other primitives (int, double, etc.) as well as for more basic data objects such as String and BigInteger. Thus, a field class indicates at run time which primitives it supports.

Storing the data in this format advantageously allows the frame engine 124 and/or other programs to access and modify the data without the need to explicitly decode platform or protocol specific data structures. The frame engine 124 provides an application programming interface ("API") for accessing the platform independent data objects. The frame engine 124 may provide a scripting interface for scripting languages such as JAVASCRIPT, PYTHON, RUBY, and the like.

Most basically, the frame engine 124 provides access to the data packet 126 using a type of field 122 known as a frame. The frame is a type of data structure that consists of an ordered set of dynamically defined field classes. However, the frame itself is a type of field, and therefore this type of data structure can be arbitrarily nested. Although well suited to process the nested blocks of data used by many communication protocols, a frame could represent data encoded in XML or some other format.

The terms "processing" or "decoding" a frame, mean allowing access to the various fields, which contain protocol specific data types, as native language data types, so that those values can easily be read, manipulated, and written in the native language (JAVA, for example). They are then accessed in the natural data types of the Java language, which is a platform independent representation. The frame engine 124 allows data fields in these potentially complex data structures to be accessed as platform independent data objects 119 by name, using a hierarchical naming convention. Note that in one embodiment, JAVA is the "native language", and the platform independence of the data representation is due to the platform independence of Java's data representation. Not all languages provide a platform independent data representation; for instance, the C/C++ language data representation is dependent on the architecture of the processor on which the code executes. While one embodiment may be is tightly tied to the JAVA language, if it were to be implemented in a different language, then the "working" data representation (that presented after a decode operation) would not necessarily be platform independent; it would depend on the specific language.

For example, given a frame f, then f.getInteger("asdu.header.type") refers to the integer value translation of the field "type" which is expected to be in a frame which is itself a field named "header" in a surrounding frame, and that frame is itself a field named "asdu" in the outermost frame. Likewise, f.setInteger("asdu.header.type", 3) will set the same field to the protocol specific translation of the value of 3.

The routing computer 102 may perform data conversion and access operations on the platform independent data objects 119. In one embodiment, the routing computer then translates the platform independent data objects 119 into the proper protocol for transmission to the HAN devices 108. The routing computer 102 may then transmit the translated data packets 126 to the HAN devices 108. In another embodiment, the platform independent data objects 119 are processed on the routing computer 102 for access by external applications. These external applications may execute on the routing computer 102 or on another client device 104 networked to the routing computer 102.

In one embodiment, the routing computer 102 is a general purpose computer that operates as a specific purpose computer executing a frame engine 124 containing an embodiment of the present invention. The general purpose computer is a computing device such as those generally known in the art. The routing computer 102 includes a central processing unit (CPU) 112, support circuits 114, and memory 116. The CPU 112 may comprise one or more commercially available microprocessors or microcontrollers that facilitate data processing and storage. The various support circuits 114 are utilized to facilitate the operation of the CPU 112 and include such circuits as clock circuits, power supplies, cache, input/output circuits and devices, and the like. The memory 116 may comprise random access memory, read only memory, removable storage, optical disk storage, disk drive storage, and combinations thereof. In one embodiment, the memory 116 stores an operating system 118, a network module 120, one or more field classes 122, a frame engine 124, one or more data packets 126, one or more decoder classes 128, and one or more configuration files 130. In operation, the CPU 112 executes the operating system 118 to control the general utilization and functionality of the host computer.

The memory 116 further comprises a frame engine 124. When executed by the CPU 112, the network module 120 causes the general purpose computer to behave as a specific purpose computer for the purpose of routing, encoding, and decoding data packets 126. The frame engine 124 may be implemented as part of a network routing program such as contained within commercially available standalone router devices, or it may be implemented as a separate application. In some embodiments, the network module 120 may listen for network traffic. The network module 120 parses data packets 126 incoming from the client devices 104 and HAN devices 108.

The network module 120 acts to perform data communications from the computer 102 across the networks 106 and 110. The network module 120 sends and receives the data packets 126. The network module 120 parses the data packets 126 based upon metadata maps contained within the field classes 122 by using the frame engine 124. In some embodiments, the network module 120 passes the received data packets 126 to the frame engine 124. In some embodiments, the frame engine 124 is executed as a subroutine of the network module 120. The frame engine 120 decodes the data packets 126 in accordance with frame definitions contained within the field classes 122. Embodiments of this process are discussed further with respect to FIG. 3.

In some embodiments, the field classes 122 may contain "raw" field classes which are a type of field that provides a reference to decoder class 128 (a piece of executable code) that is invoked with undecoded data in order to find or generate an object for use in decoding that field. In other words, when the decoder class executes, it replaces the raw field with a frame of the proper type to do the decoding for that field. Generally field classes have operations for getting and setting the data values, and for translating those values to and from the encoded representation (encode/decode). A frame decodes by executing a decode operation in turn on each of its constituent field classes. Typically, one of these "raw" field classes represents a protocol layer, and the group of frame definitions used at one level will represent a different protocol layer than the enclosing or enclosed frames.

For example, the frame engine 124 may provide one or more of the following decoder classes 128 for use in decoding the data packet 126:

Cluster Decoder: Decodes a ZCL frame (ZigBee Cluster Library) based on the cluster and command IDs, using a decode table to map numeric cluster and command IDs to the name of a field definition to use for the frame.

Array Decoder & List Decoder: Decodes arrays of a named frame type with an explicit (ArrayDecoder) or implicit (ListDecoder) length.

Frame Decoder: Decodes a field using an explicitly named frame definition.

The decoding procedure is bootstrapped by some code (such as the frame engine 124 or a driver) calling the decode method with the incoming data (even if that frame definition only contains a single "raw" data field with a decoder reference). The previous examples are given to illustrate possible embodiments of a decoder class 128. One of ordinary skill in the art would recognize that decoder classes 128 can be created for different protocols and data formats.

Figure 2:
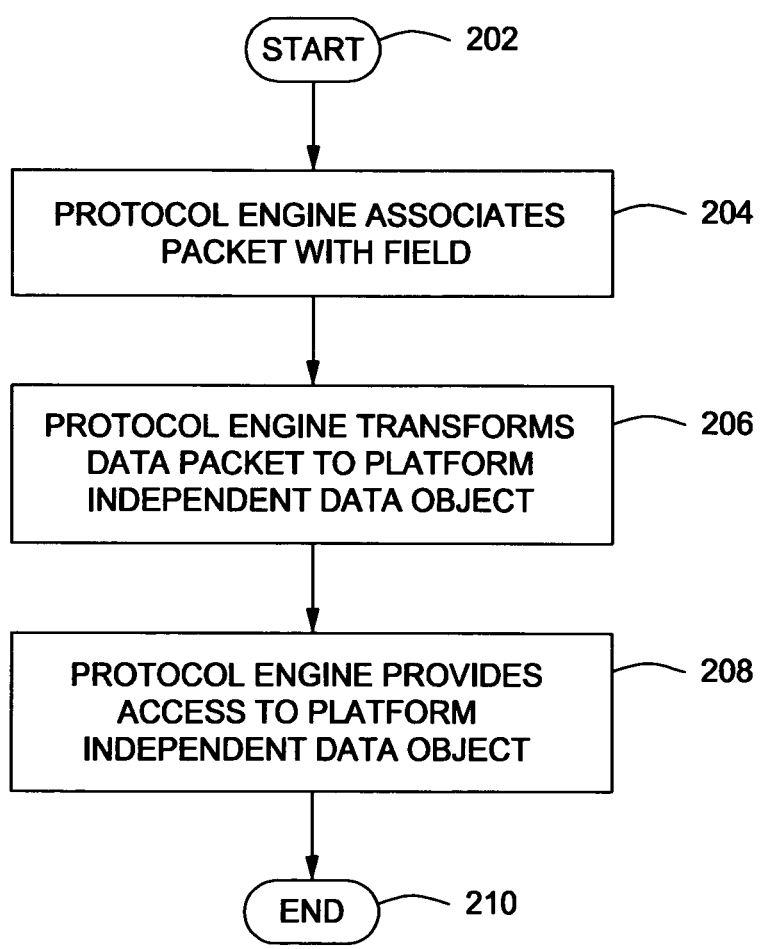
FIG. 2 is a flow diagram of a method for providing a platform independent interface.

FIG. 2 is a flow diagram depicting an embodiment of a method for implementing a home area network middleware interface 200. The figure begins at step 202 where the frame engine 124 receives a data packet 126 encoded in a first communication protocol.

The data packet 126 is comprised of one or more frames of data encoded in a specific communication protocol. At step 204, the frame engine 124 associates the data packet 126 with one or more field classes 122 for processing the particular protocol of the packet 126. The frame engine 124 knows enough about the device specific data packet to either apply a known field 122 (a "link" frame) or supply a decoder class that can use other criteria (for example the value at some known offset in the incoming data) to select a field 122 appropriate to decode that data. In one embodiment, the frame engine 124 uses a dynamic lookup table to translate the values at known offsets within the data packet 126 into an identifier, and that frame is then used to decode the data.

The frame engine maintains a number of drivers, which are classes listed in a configuration file. The driver knows how to manage a particular type of connection to a Home Area Network. For instance, one driver may communicate via a USB connection to a locally connected network device, using the TI link protocol. Another driver may communicate over TCP/IP with a HAN gateway, such as the DAINTREE SENSOR NETWORK ANALYZER. It is the driver for a particular connection type that contains instructions to bootstrap the decoding process for an incoming data packet.

A connection to the HAN is required to send (encode) and receive (decode) frames, and the software component that handles a connection is called a driver. In the present invention, the driver is a modular software component that mediates the communications with a particular type of network device or gateway to allow communications with other devices on a HAN. A connection provides operations such as receiving or sending frames and managing the gateway device. Drivers are configured at runtime in a configuration file 130. The following is an example entry in this file:
<driver>com.wirelessglue.driver.SnaConnection</driver>

This entry causes the named class to be loaded as a driver class when embodiments of the present invention are initialized. When establishing a connection, a connection specifier (much like a URL) specifies the type of connection as well as any required parameters for that connection type. For example, the connection specifier "spi2:COM3" indicates a locally attached, TI based device located at communications port 3 while "sna:192.168.10.1" indicates an instance of a HAN gateway running at the network address 192.168.10.1. The frame engine delegates the recognition and parsing of connection specifiers to the driver classes.

Each field 122 is associated with an identifier, which is then used to lookup the definition of that field. For example, the field name may be turned into the location of a file containing the frame definition by the following algorithm:

Start with the base configuration directory for frame definitions

For each component in the frame name except the last (the components in a name being separated by "."), add a corresponding directory component to the file name path Add the last component of the name to the file path (with the suffix ".xml") to produce the final filename. So, if the base installation directory is, for example, C:\glue-1.0.0, and the frame configuration directory is "frames", then the definition of the frame named zcl.header will be found in the file C:\glue-1.0.0\frames\zcl\header.xml This algorithm may be used to locate the definition files for a number of objects in addition to field classes 122. For instance, in one embodiment name-to-value translations are named and stored in a similar fashion under the "enums" directory, and ZigBee cluster definitions (which themselves contain nested frame definitions) are stored under the "clusters" directory. Although these identifiers are discussed with respect to file names, one or ordinary skill in the art would recognize that it is possible to allow configuration data to come from a number of other sources including a relational database, a file "resource" inside of a JAVA Archive (jar) file, or from a web server.

At step 206, instructions within the field classes 122 are used to transform the data packet 126 into one or more platform independent data objects 119. The data packet 126 may be comprised of multiple types of data. For example, the data packet 126 may include a protocol header along with payload data. The protocol header may include the information required to transmit the data packet 126 in the originating protocol, such as the source and destination addresses. The payload data may be one or more data structures intended for the destination device. The field classes 122 contain instructions for translating the data within the data packet 126 into platform independent data objects 119. The translation process is discussed in further detail with respect to FIG. 3.

At step 208, the frame engine 124 provides access to the platform independent data objects 119. The frame engine 124 uses rules and instructions from a field 122 associated with the data types contained within the platform independent data objects 119. In some embodiments, the frame engine 124 may encode the platform independent data objects 119 into other protocols or protocol stack layers. Each translation requires an appropriate field 122 containing instructions for translating to or from the particular data formats. As stated above, the translation process is discussed further with respect to FIG. 3.

At step 210, the method ends with the platform independent data object 119 accessible to applications capable of interfacing with the frame engine 124.

Figure 3:
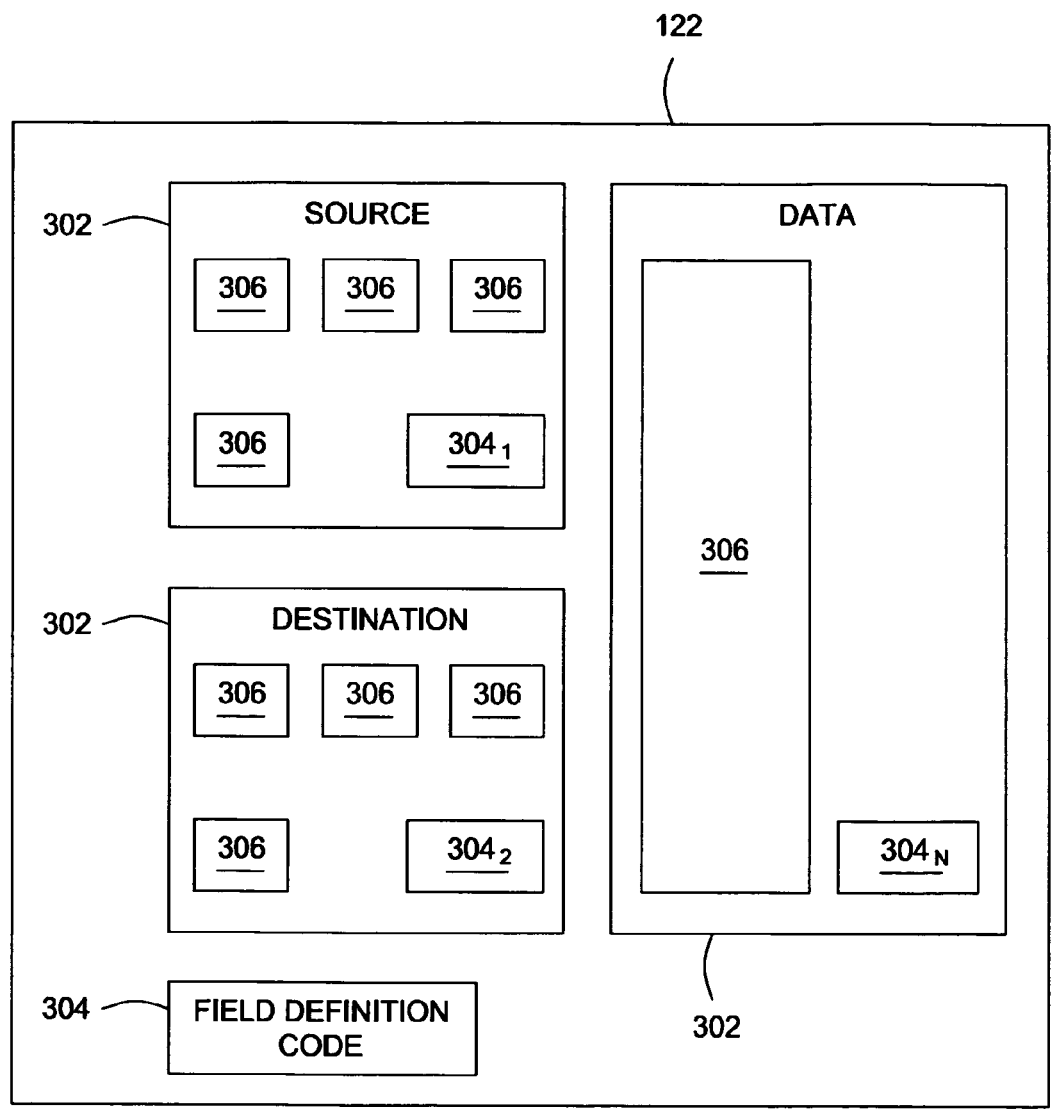
FIG. 3 is a block diagram depicting an embodiment of a frame used by the frame engine to provide the interface.

FIG. 3 is a block diagram of an exemplary embodiment of a field 122 as used by the frame engine 124 to translate the data packet 126. Field classes 122 may be comprised of multiple nested fields 302. These nested fields 302 may in turn be comprised of sub-fields 306 and frame definition code 304. In some embodiments, the field classes 122 may correspond to a particular data transmission protocol, such as TCP/IP, ZIGBEE, BLUETOOTH, and the like. The field classes 122 may also correspond to different levels of a protocol stack, or even sections of executable code referenced within the field classes 122. Within the field classes 122, the different components 302 of data packets 126 transmitted in the corresponding protocols are represented, as is field definition code 304 for interpreting these components. Field classes 122 are family of classes which are usually configured from XML metadata. Field classes can also be configured via API, so field description language definitions are not required to use field classes. The metadata descriptions (i.e. "field metadata") exist in two places; in individual files under the "frames" directory, and embedded inside cluster definition files under the "clusters" directory.

Field classes 122 translate a particular data type to and from an encoded form, in the sense that they have code that does just such a transformation. This code generally uses various parameters or properties to determine how to perform the encoding. For example, the field type that handles arbitrarily sized integers (IntegerField) must know the length of the encoded field in order to generate the correct output. This size can be configured from an XML frame definition, or it can be set through the API, or it can come from another field. It is this combination of code and parameters that together do the translation (encoding/decoding).

In some embodiments, the field classes 122 are configured from Extensible Markup Language (XML) metadata, but a person of ordinary skill in the art would recognize that the object definitions could be implemented in other markup languages such as JAVASCRIPT Object Notation, YAML, and the like.

The simple protocol represented by the exemplary metadata frame 122 includes three components: source, destination, and data. The source field is further divided into four sub-fields 306 and a set of field definition instructions $304_1$. The field definition code $304_1$ indicates instructions for the frame engine for how to parse the data contained within the source field. For example, the field definition code 304 may instruct the frame engine to use certain bytes within the data packet 126 as elements of each of the four sub-fields 306. These four sub-fields 306 may correspond to the four integers of an IP address, for example. The field definition code $304_1$ instructs the frame engine to store each of these four sub-fields in a platform independent format indicating the source address. In this manner, the metadata frame 122 defines the way the frame itself is parsed by the frame engine 124.

The field definition code 304 present within the field classes 122 also functions to define the method by which platform independent data objects 119 are encoded into a particular protocol or protocol layer. The field definition code 304 corresponds to the various data stored in the platform independent format necessary for encoding the data. For example, the destination may be stored in integer format in a platform independent data type. The field definition code 304 would provide instructions for encoding the destination integer into the particular format and bytes that the destination is found in data packets of the encoded protocol. The instructions needed to decode data from the protocols associated with the given metadata field 122 are contained within the metadata frame itself.

A field 122 is an object that is able to contain a value which can be queried or set, and translate that value to and from an external form, which generally consists of a byte buffer, or sequence of bytes that corresponds to a data packet sent to or from an application. Many different field types may exist in embodiments of the present invention, which are configured in a "fields.xml" configuration file 130. This file contains a mapping between tag names used in the field definition language and the names of the classes that implement the field classes. For example, this is a typical entry in this file:
<field tag="uint8" class="com.wirelessglue.field.zcl.UnsignedInteger8"/>

This specifies that the given class will be loaded to handle the "uint8" tag in the frame definition language. So, if a given frame definition has an element like this: <uint8 name="count"/> then the class "com.wirelessglue.field.zcl.UnsignedInteger8" will be loaded to handle the field. All that is necessary to add a new field type is to implement a class with the appropriate interfaces and to add it to the fields.xml file.

One basic interface is required of all field implementations (IField), but additional, optional interfaces indicate which of the various platform independent data types are supported by the field. For instance, "IIntegerValue" indicates that field can get queried or set with an integer value, and "IFloatValue" indicates that the field supports access as a floating point value. In addition to serving as marker interfaces, these interfaces define the appropriate get and set operations for that data type.

Some field classes can act like containers for other fields, and the frame is an example of this field type. A frame can contain any number of fields, including other frames. The frame class contains convenience classes for accessing nested field classes using hierarchical names, rather than by looking up each nested frame individually. Another instance of a container field in the IntegerField class upon which all of the fixed sized integer field types are based. Integers can contain individual bitfields, which appear as fields within the integer field. Unlike a frame, an integer field has an actual value itself, while the contained bitfields actually reference certain bits of that value.

Figure 4:
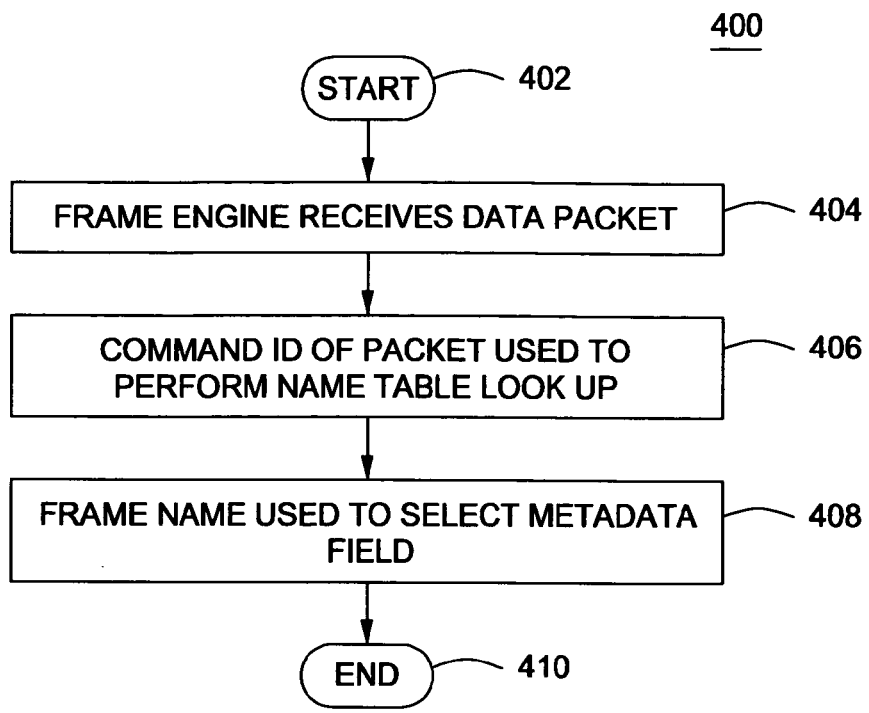
FIG. 4 is a flow diagram depicting an embodiment of a method for determining an appropriate field class to decode a data packet.

FIG. 4 depicts an embodiment or a method 400 for determining which field to use to decode a given data packet 126. The method begins at step 402, where the frame engine 124 is prepared to receive data. For example, the procedure to decode a ZIGBEE network communication would proceed as follows:

The frame engine 124 receiving data from a client device 104 typically uses some device-specific protocol that "wraps" a more standard ZigBee network frame. The incoming frames may be in a format defined by TEXAS INSTRUMENTS "ZStack" firmware, though nested inside those frames typically are ZIGBEE "APS" frames. The frame engine 124 must generally know enough about the device specific protocol to either apply a known field 122 (a "link" frame) or supply a Decoder class that can use other criteria (for example the value at some known offset in the incoming data) to select a field 122 appropriate to decode that data. The frame engine may use a dynamic lookup table to translate the values at known offsets into a frame name, and that frame is then used to decode the data.

In this example, the sequence would proceed as follows:

At step 404, the frame engine 124 accumulates data until a full data packet 126 is received. In one embodiment, the frame engine 124 uses the ZStack link protocol to receive this data.

At step 406, the frame engine 124 looks for a particular identifier corresponding to the type of data packet 126 that was received. This identifier may be used to perform a table lookup to determine a name for the proper field 122 used for decoding the data packet 126. For example, when a ZStack packet is received, the 16 bit command ID of the ZStack frame is looked up in the dynamic "enumeration" named spi2.commands. This table will return a name for the given 16 bit value (in a reverse lookup), for example if a 16 bit command has an ID of 0x4481, the value "AF_INCOMING_MSG" will be returned from this lookup since one of the entries in the file enums\spi2\commands.xml looks like this: <entry name="AF_INCOMING_MSG" value="0x4481"/>

At step 408, the frame engine 124 uses the frame name determined in step 406 to select the appropriate field 122. Using the ZStack example, the prefix for the ZStack link frames is then prepended to the returned name (getting spi2.AF_INCOMING_MSG), and this value is then used as a frame name for the decode. So, ultimately, the frame definition used for the decode is found in the file frames\spi2\AF_INCOMING_MSG.xml. (if the command ID is 0x4481). The method ends at step 410 after the proper field has been identified.

However, the exact algorithm used to bootstrap decoding is dependent on the protocol and the context. The frame engine 124 may communicate using an XML protocol, and in that protocol the incoming XML contains the frame name as a string. That driver takes this name directly from the XML, prefixes the driver prefix, and uses this as the frame name to decode Decoding is "chained" meaning that the new frame used for decoding incoming data can itself have "raw" field classes associated with a decoder. Such decoders will be invoked as they are encountered until all data is decoded.

In one embodiment of the present invention, the field classes 122 represented in a configuration file 130 implement the data types necessary to implement the ZigBee protocol, and the set of data definitions known as the ZigBee Cluster Library (ZCL).

In addition to simple frame definition files, where one frame definition is listed in a location derived from the frames name, there is another form of frame definition, a special form (the cluster definition language) which has been extended to include ZigBee Cluster Library data representations. The cluster definition language differs from the frame definition language in the following ways:

Although each cluster definition is found using a similar method to that used for frame and enumeration definitions discussed elsewhere, that is, the file name is derived from the cluster name by mapping it to a file in a particular directory, the definitions in a cluster definition are more complex; there are two sections that correspond to the server and client portions of a ZigBee cluster definition, and the ability to declare cluster attributes and cluster commands in each section. ZigBee Cluster Commands are similar to frame definitions, and any of the tags defined in the fields.xml file can be used in a cluster command definition. The primary difference is that the Cluster Library header is assumed to be prepended to any command definitions listed in a cluster definition. That is, certain field classes, corresponding to the header fields of a ZigBee Cluster command header, are assumed to be contained in all cluster commands, and so the fields actually listed in the command definitions are those in addition to the implied fields.

In addition to cluster commands, cluster attributes can be defined in each section (client and server) of a cluster definition. Cluster attributes are dynamically typed data items that can be read and written via "general" ZigBee commands. Field types (by XML tag name) are also used to identify attribute data types, so the list of allowed data types for the attributes is the same as the list of tags allowed in field definitions.

In addition, there is a configuration file 130 with a predefined name "general-commands.xml" that defines all of the ZigBee general commands, since they are not defined inside of any particular cluster definition.

Figure 5:
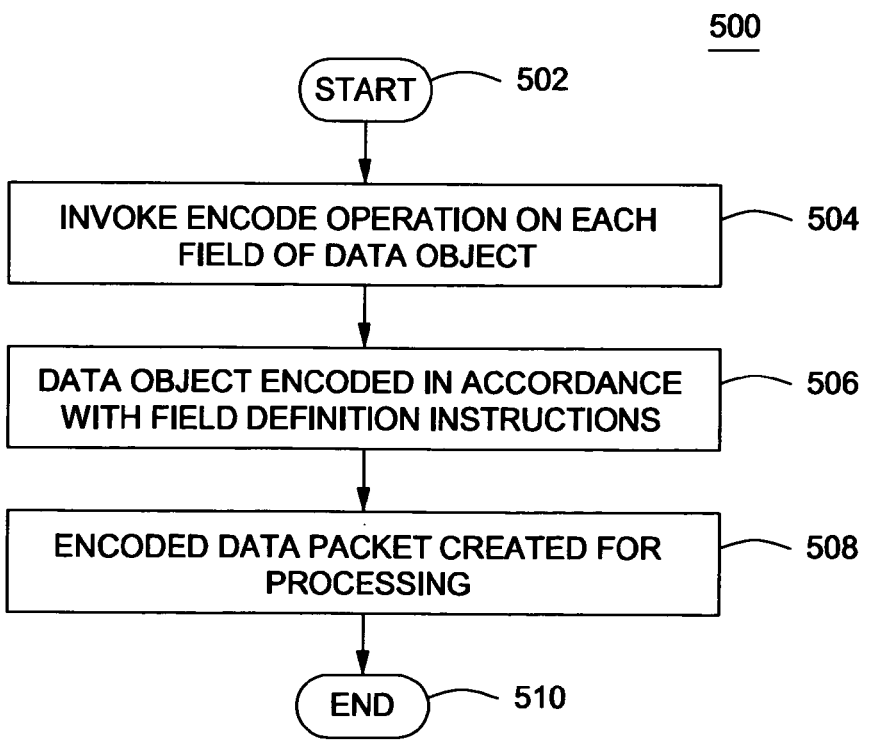
FIG. 5 is a flow diagram depicting an embodiment of a method to encode one or more data objects into a data packet.

FIG. 5 depicts an embodiment of a method for encoding the platform independent data representation into the appropriate format described by the field description. This process starts at step 500 with a frame that has been populated with values through the "set" methods or other operations in the API.

At step 502, the encoding process for a frame generally involves invoking the encode operation on each of the field classes that it contains, in turn. Since a frame is also a field, frames can be arbitrarily nested. However, since some of the metadata constructs in the field definition language allow for conditional presence or alternative field selection, this sequence is not necessarily linear. That is, the presence of a field can be conditionally dependent on the value of another field, or one field from a number of alternatives can be selected based on the value of another field (the same holds true for the decoding process). At step 508, the method creates a "packed" byte array, or data packet 126, ready to be sent or handed to another software component. The method ends at step 510 after the packet has been created.

Conditional inclusion of a field is accomplished in two ways (this applies to decoding as well). First, any field definition can include the attributes "presentField" and "presentValue". The following fragment of a frame definition illustrates this:

---

<uint8 name="Status"/>
<ieeeaddr name="IeeeAddr" presentField="Status" presentValue="0"/>

---

This fragment defines two fields, Status and IeeeAddr. The IeeeAddr field will only be present if the field Status has the value of 0. The presentValue attribute can also contain a list of alternatives separated by the vertical bar character; in that case the field will be considered present if it matches any of the values listed.

The other way that fields can be conditionally included is through use of a type of field that can contain a number of alternative fields, selected by the value of another field. This is illustrated by this fragment of frame definition language:

---

<uint8 name="DestAddrMode"/>
    <select name="DestAddr" field="DestAddrMode">
    <uint16 select="2"/><ieeeaddr select="3"/></select>

---

The DestAddr field will delegate to either the "uint16" or "ieeeaddr" field types, depending on the value of the "DestAddrMode" field. If the value is 2, then the uint16 field is selected, if the value is 3, then the ieeeaddr field is selected.

While the foregoing is directed to embodiments of the present invention, other and further embodiments of the invention may be devised without departing from the basic scope thereof, and the scope thereof is determined by the claims that follow.

The invention claimed is:

1. A method for implementing a network interface in a computer network performed by a special-purpose computer programmed by a frame engine comprising:
   receiving one or more data packets encoded in a first communication protocol;
   decoding the data packets into a set of data objects wherein the data packets are decoded in accordance with a machine-readable set of protocol frame definitions containing one or more sub-fields for parsing of the data packets; and
   encoding the data objects into a second communication protocol wherein the data objects are encoded in accordance with the machine-readable set of protocol frame definitions.

2. The method of claim 1, further comprising: transmitting the encoded data objects to a destination device.

3. The method of claim 1, wherein the sub-fields of the machine-readable set of protocol frame definitions may contain a reference to executable code to encode or decode the one or more sub-fields.

4. The method of claim 1, wherein the sub-fields of the machine-readable set of protocol frame definitions may contain one or more rules used by the frame engine to encode or decode that sub-field.

5. The method of claim 4, wherein the interface is provided by an application programming interface.

6. The method of claim 1, further comprising providing an interface to access the set of data objects.

7. The method of claim 6, wherein the application programming interface is provided by a scripting language interface.

8. A computer apparatus for implementing a network interface in a computer network comprising:
   a.) at least one processor;
   b.) at least one support circuit; and
   c.) at least one storage device storing processor-executable instructions comprising:
      a frame engine to receive and decode a data packet transmitted in a first communication protocol;
      a machine-readable set of protocol frame definitions containing one or more sub-fields for decoding the data packet in the first protocol into a set of data objects; and
      a second machine-readable set of protocol frame definitions for encoding the data objects into a second communication protocol
         which, when executed by the at least one processor, performs a method including:
         1) receiving one or more data packets encoded in the first communication protocol;
         2) decoding the data packets into the set of data objects wherein the data packets are decoded in accordance with the machine-readable set of protocol frame definitions containing one or more sub-fields for parsing of the data packets; and
         3) encoding the data objects into the second communication protocol wherein the data objects are encoded in accordance with the machine-readable set of protocol frame definitions.

9. The apparatus of claim 8 further comprising a network module to transmit the encoded data object to a destination device.

10. The apparatus of claim 8 wherein the frame engine provides an application programming interface for accessing the data objects.

11. The apparatus of claim 10 wherein the application programming interface is provided by a scripting language interface.

12. A computer network implementing a protocol neutral interface comprising:
    a network of client devices communicating using a first communication protocol;
    a routing computer coupled to the network, wherein the routing computer executes a frame engine for decoding communication data packets into a set of data objects, the data packets are received from the network of client devices and decoded into the set of data objects in accordance with a machine-readable set of protocol frame definitions containing one or more sub-fields for parsing of the data packets; and
    client devices communicating using a second communication protocol coupled to the routing computer, wherein the frame engine encodes the data objects in accordance with the machine-readable set of protocol frame definitions.

13. The computer network of claim 12, wherein the set of data objects are protocol neutral and the frame engine provides an application programming interface to the data objects.

14. The computer network of claim 12, wherein the machine-readable set of protocol frame definitions comprise one or more sub-fields.

* * * * *